(12) United States Patent
Serra et al.

(10) Patent No.: US 7,426,688 B2
(45) Date of Patent: Sep. 16, 2008

(54) EMBEDDED SPREADSHEET COMMANDS

(75) Inventors: Bill Serra, Montara, CA (US); Salil Pradhan, San Jose, CA (US); Antoni Drudis, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 616 days.

(21) Appl. No.: 10/979,268

(22) Filed: Nov. 2, 2004

(65) Prior Publication Data
US 2006/0095832 A1 May 4, 2006

(51) Int. Cl.
*G06F 17/00* (2006.01)

(52) U.S. Cl. .................. 715/212; 715/267
(58) Field of Classification Search ............ 715/503, 715/504, 509, 212, 267
See application file for complete search history.

(56) References Cited

U.S. PATENT DOCUMENTS

| | | | |
|---|---|---|---|
| 5,241,620 A | 8/1993 | Ruggiero | 706/16 |
| 5,657,437 A * | 8/1997 | Bishop et al. | 715/503 |
| 5,768,158 A * | 6/1998 | Adler et al. | 716/11 |
| 5,893,123 A | 4/1999 | Tuinenga | 715/504 |
| 5,926,822 A | 7/1999 | Garman et al. | 715/503 |
| 5,995,918 A | 11/1999 | Kendall et al. | 704/1 |
| 6,034,676 A * | 3/2000 | Egan et al. | 701/29 |
| 6,490,600 B1 | 12/2002 | McGarry | 715/503 |
| 6,631,497 B1 | 10/2003 | Jamshidi et al. | 715/514 |
| 6,701,485 B1 | 3/2004 | Igra et al. | 715/503 |
| 6,988,241 B1 * | 1/2006 | Guttman et al. | 715/503 |
| 7,127,704 B2 * | 10/2006 | Van De Vanter et al. | 717/112 |
| 2002/0138588 A1 * | 9/2002 | Leeds | 709/217 |
| 2003/0154386 A1 * | 8/2003 | Wittkotter | 713/193 |
| 2006/0080596 A1 * | 4/2006 | Bhogal et al. | 715/503 |

OTHER PUBLICATIONS

Lai, Kum-Yew, et al, "Object Lens: A "Spreadsheet" for Cooperative Work", ACM Transactions on Information Systems (TOIS), vol. 6, Issue 4, Oct. 1988, pp. 332-353.*

* cited by examiner

*Primary Examiner*—Laurie Ries (57) ABSTRACT

A cell of a spreadsheet is automatically updated and a comment is determined to have a command associated with the update. In response to detecting the command, the command is processed.

26 Claims, 5 Drawing Sheets

EMBEDDED SPREADSHEET COMMANDS

BACKGROUND

Spreadsheets have become the life blood of many organizations. Spreadsheets are used to track inventory and resources, order goods and services, hire or contract resources, plan business activity, forecast business activity, determine business financials, and the like. However, some spreadsheet operations and some data integration can be overly complex and difficult to achieve with the interfaces that are available with spreadsheets.

For example, maintaining state associated with data of cells embedded within a spreadsheet is not easily achieved because to do so requires developing complex and lengthy formulas for each cell where there is a desire to track state changes. Additionally, spreadsheets generally provide data in generic formats and rely on external services to interpret and translate those generic formats in order to interface with the spreadsheets and their data. As a result, newly added external services have to include separate translation features for each different type of spreadsheet data for which the services may desire to integrate with.

DETAILED DESCRIPTION

Figure 1:
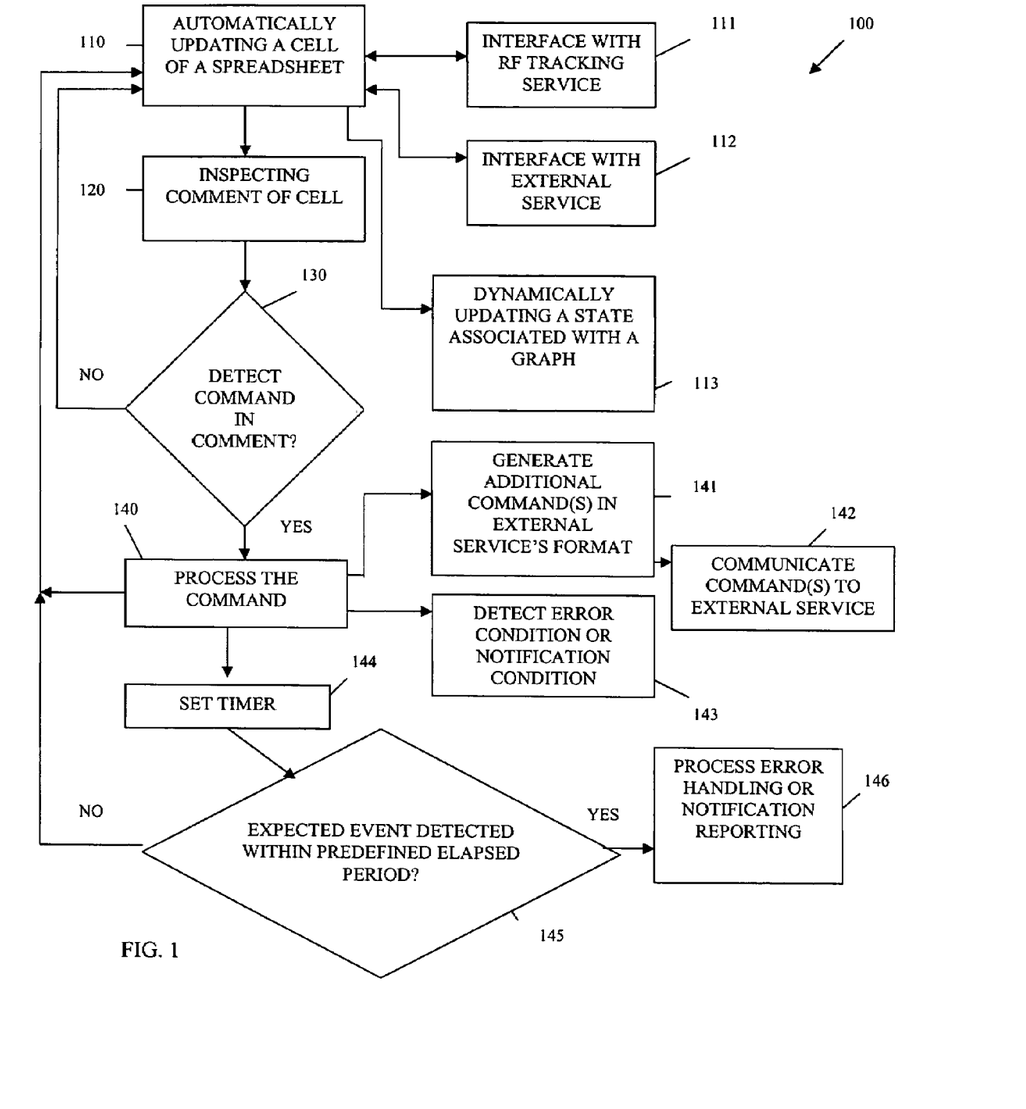
FIG. 1 is a diagram of a method for processing a command in a comment of a spreadsheet, according to an example embodiment.

FIG. 1 is a diagram of one method 100 to process a command embedded in a comment of a spreadsheet, according to an example embodiment. The method 100 (hereinafter "spreadsheet interface service") is implemented in a machine-accessible and readable medium and is optionally accessible over a network.

As will be described in greater detail herein, the spreadsheet interface service permits features and content associated with a spreadsheet to be enhanced by processing commands which are embedded within comment fields of the spreadsheet.

The spreadsheet interface service is layered over a spreadsheet. That is, the spreadsheet service interfaces with an Application Programming Interface (API) associated with a spreadsheet software application or a spreadsheet software system. The spreadsheet software application or system is used to create and modify specific spreadsheets (instances of spreadsheets). One technique for doing this is to monitor specific API calls being made in a spreadsheet to detect when operations and changes are being made to cells of the spreadsheet. These events are then detected and communicated to the spreadsheet interface service. One technique for detecting events may include monitoring when metadata associated with a spreadsheet data file changes, such as when a file-modified date is changed.

In an embodiment, the spreadsheet interface is the entity that actually makes changes to data in a spreadsheet data file. Therefore, the spreadsheet interface service is aware of when it is making a change and thus does not have to detect any specific events within the spreadsheet software application or system, since the spreadsheet interface service is making the changes through existing API calls of the spreadsheet application or system.

The actual spreadsheet application or system may be any commercially available application or system (e.g., EXCEL, ABYKUS, etc.). Additionally, the spreadsheet application or system may be any custom-developed or open source application or system. Moreover, the spreadsheet application or system may process within any operating system environment (e.g., LINUX, UNIX, WINDOWS, etc.). The teachings and embodiments presented herein can be achieved without modifying or augmenting any existing API associated with any specific spreadsheet application or system.

As used herein a "service" is a single application or a combination of applications that cooperate as a system. An external service is one that is not natively integrated or interfaced to an API of a spreadsheet application or system. Thus, as used herein "external" indicates that a particular service is not capable of directly interfacing with an API of a spreadsheet. This does not mean that the external service is incapable of processing and/or consuming spreadsheet data. In fact, some external services may be capable of translating spreadsheet formatted data and producing spreadsheet formatted data. However, an external service does not natively interface with an API of a spreadsheet application or system.

A "command" is a string constant or an expression using a variety of string constants, which is recognized as reserved syntax by the spreadsheet interface service. The command may be recognized via special delimiter characters (e.g., #, (@, $, &, *, /, etc.) or combinations of special characters (e.g., ##, //, #$, etc.). The special delimiter characters may surround commands or may precede commands. In an embodiment, delimiter characters are not used at all; rather, string constants are detected and used to recognize the commands (or expressions). The commands are embedded within comment fields of spreadsheet instances (herein after "spreadsheets"). The commands are parsed and recognized by the spreadsheet interface service and prompt the spreadsheet interface service to take some action. The spreadsheet interface service may be configured to recognize and process any custom-defined syntax and set of actions via the commands.

In an embodiment, some of the commands may actually be in the syntax and the format of recognized formula operations or macro operations that a spreadsheet application or system is capable of processing. In this manner, additional standard spreadsheet formulas or macros may be embedded within a comment of a spreadsheet and recognized by the spreadsheet interface service. The spreadsheet interface service then detects these commands and submits them for processing to the spreadsheet application or system when it is appropriate to do so.

Commands may be added to spreadsheet applications and systems using their existing API calls within a particular spreadsheet. For example, in EXCEL a string of text can be added to any particular cell in the following manner. A cell is selected with a mouse click and then the pull-down menu for Insert is activated and the Comment option selected with another mouse click. At this point, a user may add any string of text to the comment field for the selected cell. The contents of a cell's comments are viewed when the mouse is placed over a cell that has a comment. Of course, each particular spreadsheet application or system may have its own user-defined manner in which comments are added to cells and viewed from the cells. Thus, the exact technique for adding and viewing comment text for cells is dependent on the spreadsheet application or system that the spreadsheet interface service is monitoring and layered upon.

An example command syntax may appear as "#=SUM (A1:A10) #;" where "=SUM (A1:A10)" is a formula operation recognized and processed by EXCEL by instructing the EXCEL API to sum the contents of cells A1 through A10. In this example, the command is in a syntax which can be processed as a formula operation within the EXCEL spreadsheet software system. The command may appear within a comment of one or several other cells, such as cell D1 or cells D1 through D10. The command may be compound, which means that it includes multiple commands strung together (commands may be separated by a delimiter, such as a semicolon). The command may also be in custom recognized syntax, which is understood by the spreadsheet interface service and processed exclusively by the spreadsheet interface service.

Initially, the spreadsheet interface service is configured to communicate with a desired spreadsheet application or system's API. Moreover, the spreadsheet interface service is configured to recognize and perform predefined actions based on a predefined grammar or language associated with the desired commands and their syntaxes and semantics.

In an embodiment, the grammar may be defined within an extensible markup language (XML) and represented as an extensible style sheet definition (XSD). In this manner, the spreadsheet interface service may automatically and dynamically configure itself to process new and previously unknown grammars associated with previously unknown commands by parsing an XSD.

Referring now to FIG. 1 and the processing of a configured spreadsheet interface service, at 110, the spreadsheet interface service automatically and dynamically updates a particular cell of a spreadsheet.

In an embodiment, at 111, the spreadsheet interface service decides to update the cell based on interactions associated with interfacing to a Radio Frequency (RF) tracking service. The RF tracking service may monitor the physical movements of products for a particular organization. For example, RF tags may be placed on products of an organization and RF receivers may be placed at various locations throughout stores, warehouses, distribution centers, transportation vehicles, etc.

When a particular product is moved from its current existing location, the RF receivers detect this movement and communicate the same to the spreadsheet interface service. Thus, if the product is a toothbrush, then when the toothbrush is removed from a shelf location of a store the RF tracking service detects this and communicates the same to the spreadsheet interface service. In response to this movement of the toothbrush, the spreadsheet interface service decrements a total count within a cell of a spreadsheet for toothbrushes for a particular shelf location within a particular store. By decrementing the total count, the spreadsheet interface service has automatically updated a cell of the spreadsheet.

It should be noted, that in the toothbrush example, the RF tracking service may be configured in a variety of manners, such that toothbrushes (products) are sampled at predefined intervals for their present locations. Thus, movements of products may have to exceed some predefined threshold of deviation from their original locations. In this manner, temporary or insignificant movements of the toothbrushes are not used to continuously and unnecessarily interrupt the RF tracking service and its interaction with the spreadsheet interface service.

In other embodiments, at 112, the spreadsheet interface service may be configured to interact with any external service. The external service may be adapted to communicate events or conditions that the spreadsheet interface service determines should result in an update of a cell of a spreadsheet. Moreover, the external service may be adapted to receive and process other instructions communicated by the spreadsheet interface service.

In yet another embodiment, at 113, the spreadsheet interface service may be adapted to automatically and dynamically update a state associated with a graph. The graph may be embedded in a different spreadsheet or may be associated with any other graphical user interface (GUI) service. For example, suppose that the toothbrush in the previous example is also being tracked through animation in a graph in order to dynamically depict its movements from shipping to customer purchase. When the spreadsheet interface service detects the toothbrush being removed from the shelf through interactions and communications with the RF tracking service, the spreadsheet interface service may indicate this state change to the service associated with the graph as a state change. The graph service may then elect to take this information and dynamically communicate it within the graph, such as by making a node of the graph associated with shelf location have a distinctly new color or new effect (flashing).

At 120, once a cell is updated, the spreadsheet interface service inspects a comment field (herein after "comment") associated with the updated cell to determine if a command is present in that comment. If, at 130, no command is detected within the comment, then the spreadsheet interface service continues to monitor and to update other cells of the spreadsheet when appropriate. However, if, at 130, a command is detected within the comment, then, at 140, the spreadsheet interface service processes the command. That is, the spreadsheet interface service determines what action or actions are associated with the command and the spreadsheet interface service performs those action(s). In some cases, the spreadsheet interface service may have to evaluate expressions associated with the command before the appropriate action(s) can be resolved and processed. In other cases, the spreadsheet interface service may process some portions of the command by submitting the commands to the API of the spreadsheet application or system, such as when the commands are existing spreadsheet formulas or macros.

For example, suppose that with the toothbrush example that a cell within the spreadsheet has a command that instructs the spreadsheet interface service to detect a state change when the total count for toothbrushes is decremented from the cell and to send alerts or notifications if another cell within the spreadsheet is not updated within some predefined period of elapsed time. This may be useful because an organization may expect that its revenue for toothbrushes located in another cell of the spreadsheet is incremented shortly after its shelf inventor for toothbrushes is reduced. If toothbrush revenue is not increased within some predefined elapsed period of time, then this may indicate that a customer has moved the toothbrush to a different location within the store and discarded it or that the customer has stolen the toothbrush. When the toothbrush is located via a RF tracking service interfaced to the spreadsheet interface service within a different shelf location, then the spreadsheet interface service may generate a notification for store employees to retrieve it and place it back in its proper shelf location. Moreover, the spreadsheet interface service may generate periodic reports for employees to gather various products that are in their incorrect locations and to return them to their proper locations and if this is not done within some predefined period of time, then reports may be issued to management of the store.

In an embodiment, at 141, the spreadsheet interface service may also generate a variety of additional commands in response to processing a command embedded in an updated cell of the spreadsheet. These commands may be translated into formats and operations recognized by one or more external services, and, at 142, communicated to those external service(s) for subsequent processing. This feature permits the spreadsheet interface service to interact with external services that may desire notification or modification based on the processing of the command embedded in the comment of the updated cell.

In another embodiment, at 143, the spreadsheet interface service may detect an error condition or notification condition in response to processing the command. An example of how this may occur was supplied above with the toothbrush being removed from a shelf but not resulting in a corresponding purchase. One technique for achieving this example and other situations is for the spreadsheet interface service to set a timer, at 144, in response to processing the embedded command within the comment. If, at 145, an expected event is not detected (e.g., update of another cell within the spreadsheet, etc.) within a predefined elapsed period of time, then, at 146, the spreadsheet interface service may process error handling or notification reporting.

Embodiments of the spreadsheet interface service demonstrate how custom commands may be embedded within a spreadsheet for purposes of achieving operations and integration to enhance the usefulness of spreadsheet applications and systems. State changes are more easily identified and accounted for within cells of spreadsheets. Furthermore, the content of the spreadsheet more readily reflects real time and dynamic conditions of that content.

Figure 2:
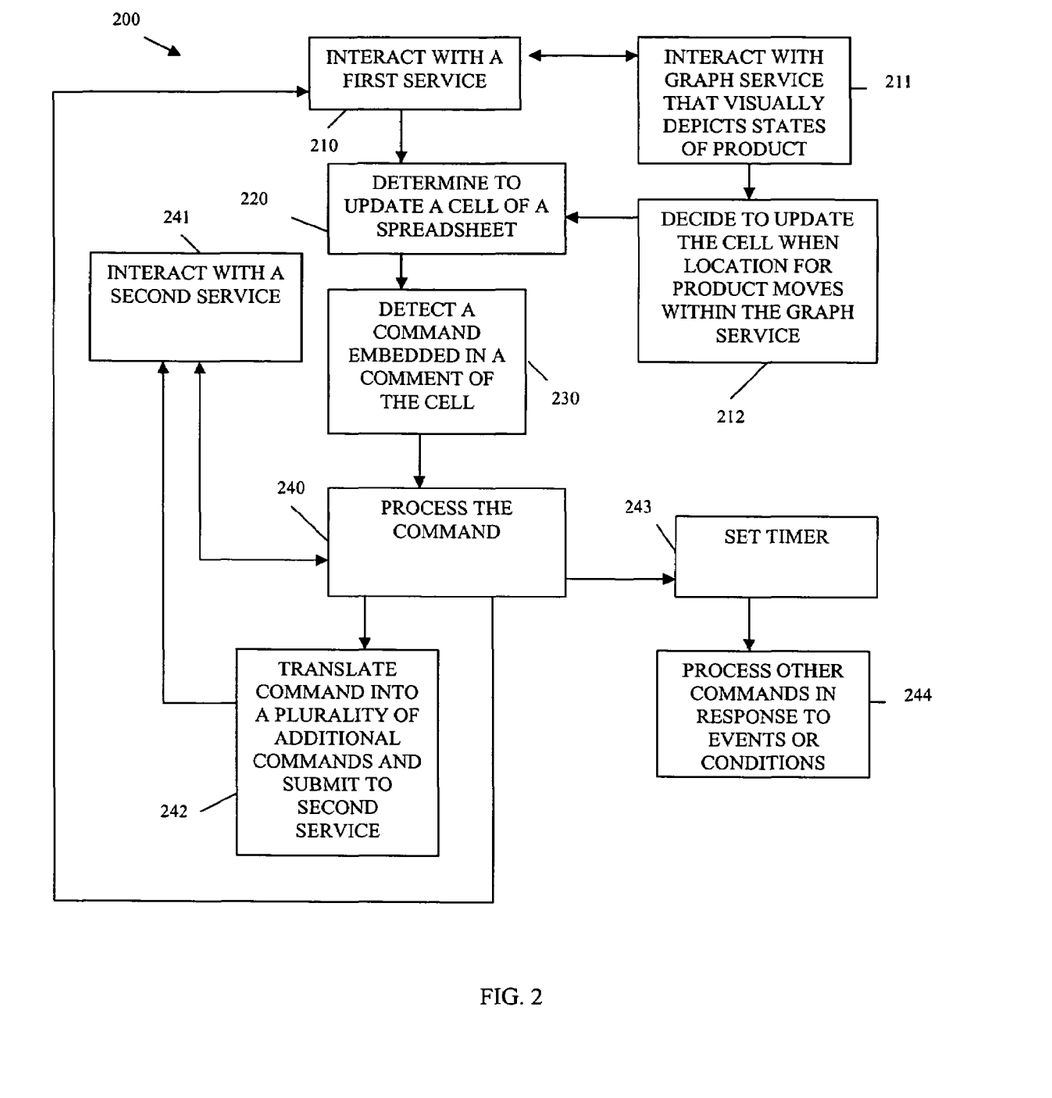
FIG. 2 is a diagram of another method for processing a command in a comment of a spreadsheet, according to an example embodiment.

FIG. 2 illustrates another method 200 for processing a command embedded within a comment of a spreadsheet, according to an example embodiment. The method 200 is implemented within a machine-accessible and readable medium and is optionally accessible over a network. The method 200 provides a different perspective of processing associated with the spreadsheet interface service represented by method 100 of FIG. 1.

Initially, the processing of the method 200 is configured to interact with an API of a spreadsheet application or system, to recognize and process commands embedded within comments of a spreadsheet, and to interact with a variety of desired external services. Accordingly, at 210, the method 200 is initiated and begins to interact with a first service.

In an embodiment, at 211, the first service is a graph service that visually depicts and perhaps animates states of a product. The states may be defined in any manner within the graph service, such as when the states depict physical locations for the product. In an embodiment, the processing of the method 200 may communicate and/or receive from the graph service state changes associated with the product. When the graph service communicates the state changes, at 212, the processing of the method 200 may decide that a cell of a spreadsheet should be updated. Again, state changes may occur for a variety of configurable reasons or events; one such circumstance is presented as an example at 212 where a product moves its location within the graph service.

At 220, a determination is made to update a cell of the spreadsheet. In one embodiment, that determination may be decided based on interactions with a first external service (e.g., at 212). In alternative arrangements, the determination may be decided based on a user that interacts directly with the spreadsheet and updates the cell, where that update is captured by the processing of the method 200. In still other embodiments, the processing of the method 200 may decide based on its own state, conditions, and/or events that it should update the cell.

When the cell is updated, the processing of the method 200 inspects the cell's comment to determine if a command is present that should be processed. At 230, a command is detected in the updated cell. This results in the command being processed, at 240. In some cases, the command or portions of the command include existing spreadsheet formula operations and/or macro operations; in these cases, the formula or macro operations may be submitted to the spreadsheet's API for processing.

In an embodiment, at 241, and in response to processing the command, the method 200 may interact with a second external service. This may entail, at 242, translating the command or other commands into a plurality of additional commands and submitting those commands in formats recognized and processed by the second service.

In yet another embodiment, at 243, and in response to processing the command, a timer may be set or an event that tracks elapsed time. The timer may be used to track when other events or conditions are met or not met and to process, at 244, other commands or to take other actions in response to the events or conditions.

Figure 3:
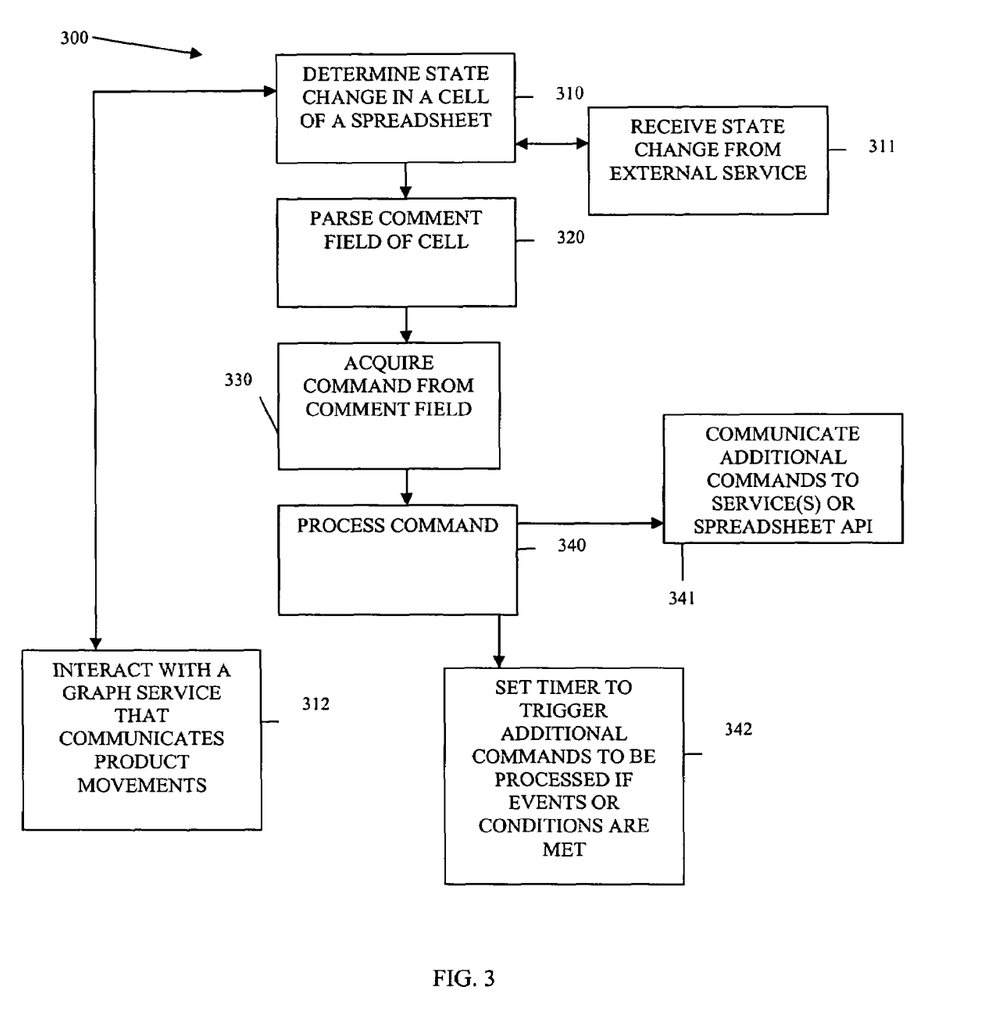
FIG. 3 is a diagram of yet another method for processing a command in a comment of a spreadsheet, according to an example embodiment.

FIG. 3 is a diagram of yet another method 300 for processing a command embedded within a comment of a spreadsheet, according to an example embodiment. The method 300 is implemented within a machine-accessible and readable medium. In an embodiment, the method 300 is implemented within removable media that is interfaced to, loaded within, and executed on a processing device. In another embodiment, the method 300 resides within portions of memory and/or storage of a processing device. In still other arrangements, the method 300 is executed as a remote service over a network or may be optionally downloaded and installed and executed on a desired processing device over the network.

Again, portions of the method 300 are preconfigured to interface with a desired API of a spreadsheet application or system, preconfigured to recognize and process predefined commands, and preconfigured to interface with one or more external services. The API of the spreadsheet application or system does not have to be modified or changed in any manner for the processing of the method 300 to perform the beneficial techniques described herein.

Once the instructions of the method 300 are loaded and processed either from a remote network location or on a desired processing device, the instructions perform the processing depicted in FIG. 3. Accordingly, at 310, the instructions determine at some point that a state for a cell has changed within a spreadsheet. A state change indicates that some modification, such as an update, has occurred to the content of the cell within the spreadsheet.

The actual change in state to the cell may have occurred as a result of other processing associated with the instructions. In other words, the instructions of the method 300 may have changed the state or updated the cell. In an embodiment, at 311, that state change may have been received from an external service or may have been decided upon based on other communications received from the external service. In a different embodiment, the state change may have originated with a user that manually edits or revises the content of the cell within the spreadsheet.

In an embodiment, at 312, the instructions interact with a graph service. The graph service communicates product movements or state transitions that occur within a graph being managed by the graph service. Again, the graph service may communicate product movements or may receive product movements from the instructions. As one example, the graph service may receive product movements from the instructions, when the instructions are also interfaced to an RF tracking service that monitors locations of products based on RF tags included on the products and RF receivers located in various geographical locations. In other arrangements, the graph service may directly interface to a RF tracking service and may therefore communicate movements to the instructions. The instructions use these movements to indicate state changes or updates to cells within the spreadsheet are desired and the instructions may perform the updates directly.

Once a state change or update is detected, the instructions, at 320, identify and parse a comment field of the cell within the spreadsheet. If a recognized command is not detected, then the instructions continue to monitor the cells of the spreadsheet waiting for the next state change to one of the cells to be detected. Once a parsed comment field includes a recognized command for a cell that has been updated or had its state changed in some manner, the instructions acquire the command, at 330, for the comment field. At 340, the command is evaluated and processed.

In an embodiment, at 341, the instructions may, in response to processing the command, communicate additional commands to other services. In another embodiment, at 342, the instructions may, in response to processing the command, elect to set a timer. The timer may trigger additional commands or actions to be processed by the instructions if predefined events or conditions are met or not met within predefined elapsed periods of time.

Figure 4:
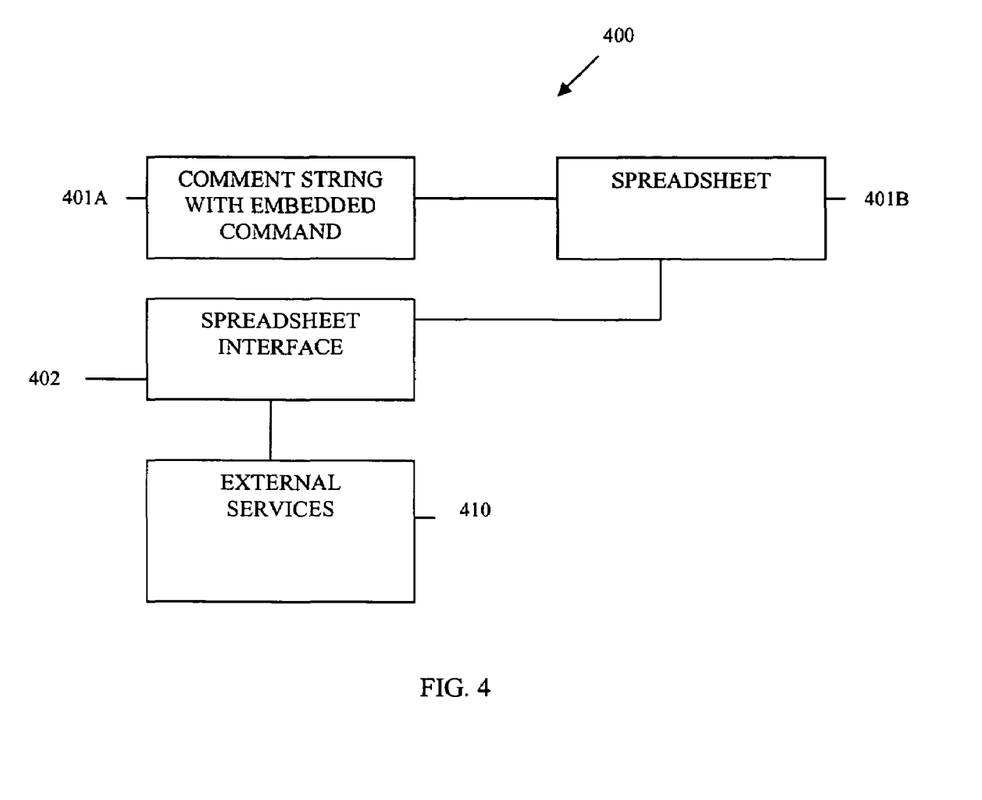
FIG. 4 is a diagram of a comment command spreadsheet processing system, according to an example embodiment.

FIG. 4 is a diagram of a comment command spreadsheet processing system 400, according to an example embodiment. The comment command spreadsheet processing system 400 is implemented within a machine-accessible and readable medium. Moreover, portions of the comment command spreadsheet processing system 400 implement the techniques presented above with the methods 100, 200, and 300. Furthermore, portions of the comment command spreadsheet processing system 400 are implemented within comment fields of a desired spreadsheet, which is associated with a desired spreadsheet application or system.

The comment command spreadsheet processing system 400 includes a comment string 401A and a spreadsheet interface 402. The comment string 401A includes an embedded command that is adapted to be recognized by the spreadsheet interface 402 and adapted to prompt the spreadsheet interface 402 to take a variety of configurable actions. Moreover, the comment string 401A is adapted to be represented as text data within a comment field of a spreadsheet 401B.

The spreadsheet interface 402 is adapted to interact with the API associated with the spreadsheet 401B. The spreadsheet interface 402 may be configured to interact with any desired spreadsheet application or system's API associated with the spreadsheet 401B. In an embodiment, the spreadsheet interface 402 is adapted to perform the processing depicted in FIGS. 1-3 which are associated with the methods 100, 200, and 300.

In an embodiment, the spreadsheet interface 402 is also adapted to interact, communicate, or interface with a variety of external services 410. Two example external services 410 include a RF tracking service and a graph service that were described in detail above with the methods 100, 200, and 300.

In some arrangements, the comment string 401A is adapted to be associated with multiple cells of the spreadsheet 401B. For example, a single comment string 401A may be associated within the spreadsheet for a whole column, partial column, whole row, partial row, and/or selective cells. This may be achieved using existing API operations associated with the spreadsheet 401B being used with the comment command spreadsheet processing system 400.

During operation of the comment command spreadsheet processing system 400, a spreadsheet 401B is modified to include a variety of comment strings 401A which have embedded commands. When a cell associated with the comment string 401A is modified, the spreadsheet interface 402 is adapted to recognize, acquire, and process the command embedded within the comment string 401A.

In some arrangements, it is the spreadsheet interface 402 that actually modifies the cell or is instructed to modify the cell by an external service 410. In another embodiment, the cell is modified by a user interacting with the spreadsheet 401B using the API of the spreadsheet application or system. In some cases, after processing the command embedded in the comment string 401A, the spreadsheet interface 402 may be prompted to take other actions on other cells of the spreadsheet 401B, set timers, or transmit other instructions or commands to external services 410.

Figure 5:
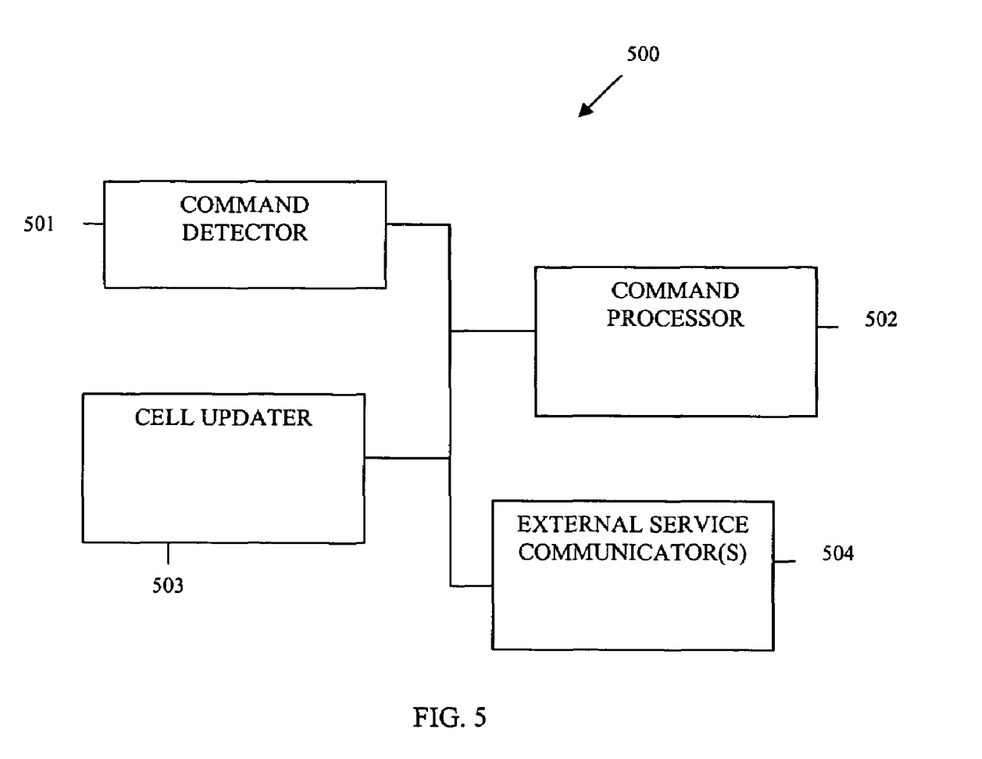
FIG. 5 is a diagram of a comment command spreadsheet processing system, according to an example embodiment.

FIG. 5 is diagram of another comment command spreadsheet processing system 500. The comment command spreadsheet processing system 500 is implemented in a machine-accessible and readable medium and is optionally accessible over a network. The components of the comment command spreadsheet processing system 500 depicted in FIG. 5 are presented for purposes of illustration only and are not intended to limit the teachings presented herein.

Thus, some components may be condensed into composite entities, other components may be exploded into multiple sub entities, some components may be removed, and/or some additional components may be added. In an embodiment, the comment command spreadsheet processing system 500 implements, among other things, the techniques presented above with respect to the methods 100, 200, and 300. Moreover, in an embodiment, the comment command spreadsheet processing system 500 implements the processing of the spreadsheet interface 402 associated with the comment command spreadsheet processing system 400 of FIG. 4.

The comment command spreadsheet processing system 500 includes a command detector 501 and a command processor 502. In some arrangements, the comment command spreadsheet processing system 500 also includes a cell updater 503 and one or more external service communicators 504.

In an embodiment, the command detector 501 is a means for detecting a command within a spreadsheet. The means for detecting the command may be implemented as software service(s), application(s), function(s), instructions, and/or module(s) which are adapted to parse comment fields of cells associated with the spreadsheet and acquire any embedded commands. The means for detecting the command may be interfaced to an API of the spreadsheet application or system for purposes of accessing the data contents of a cell's comment field. Furthermore, the means for detecting the command may be interfaced to the cell updated 503 for purposes of determining when it is appropriate to inspect a particular cell's comment field for any embedded command. Also, the means for detecting the command may be interfaced to the command processor for purposes of forwarding detected commands for processing.

In an embodiment, the command processor 502 is a means for processing the command. The means for processing the command may be implemented as software service(s), application(s), function(s), instructions, and/or module(s) which are adapted to evaluate expressions, perform logic, and take action for purposes of processing a command detected by the command detector 501. In addition to being adapted to interface with the command detector 501, the means for processing the command is adapted to be interfaced to one or more external service communicators 504 for purposes communication actions or instructions to the external service communicators 504 in response to processing the command.

In an embodiment, the cell updater 503 is a means for automatically and dynamically updating a cell of a spreadsheet. The means for updating the cell may be implements as software service(s), application(s), function(s), instructions, and/or module(s) which are adapted to update all or a portion of a cell's data content. The means for updating the cell may be adapted to interface within one or more external service communicators 504 for purposes of deciding whether to update a particular cell of the spreadsheet and for purposes of notifying the command detector 501 of any such update that the means for updating a cell performed. The means for updating the cell may also be adapted to monitor a session associated with a user that interacts with the API of the spreadsheet application or system for purposes of communicating a cell update to the command detector 501.

In an embodiment, the external service communicator(s) 504 is a means for interfacing with one or more external service, which are external to the spreadsheet. The means for interfacing with one or more external services may be implemented as software service(s), application(s), function(s), instructions, and/or module(s) which are adapted to use existing API's of external services for purposes of receiving actions and communication actions from the command processor 502 and/or the cell updater 503. Thus, the means for interfacing with one or more external services is adapted to translate actions or instructions that may be understood by the external service's APIs and is adapted to translate actions or instructions received from those APIs into formats that can be interpreted and processed as other actions b the cell updater 503 and/or the command processor 502.

The comment command spreadsheet processing system 500 is adapted to integrate external services into the maintenance and management of data content included within a spreadsheet. Moreover, the comment command spreadsheet processing system 500 is adapted to perform a variety of enhanced programming features within a spreadsheet based on embedded comment commands.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
   automatically updating a cell of a spreadsheet;
   detecting a command embedded in a comment of the cell, wherein the command is one of a plurality of different commands, each of the different commands being configured to be embedded in the comment of the cell and processed by a command processor; and
   the command processor processing the command embedded in the comment of the cell.

2. The method of claim 1 further comprising, interfacing with a radio frequency (RF) tracking service to receive information that indicates the cell of the spreadsheet is to be automatically updated.

3. The method of claim 1 further comprising, interfacing with a service that is external to the spreadsheet in response to processing the command.

4. The method of claim 3, wherein automatically updating further includes dynamically updating a state associated with a graph, and wherein the graph is external to the spreadsheet.

5. The method of claim 1, wherein processing further includes detecting at least one of an error condition and a notification condition in response to processing the command.

6. The method of claim 1, wherein processing further includes generating one or more additional commands in a format recognized by a service that is external to the spreadsheet and communicating the one or more additional commands to the service for subsequent processing.

7. The method of claim 1, wherein processing further includes setting a timer in response to processing the command, and wherein if an expected event is not detected within a predefined elapsed time then processing at least one of error handling or notification reporting.

8. A method comprising:
   interacting with a first service; determining to update a cell of a spreadsheet in response to interacting with the first service;
   detecting a command embedded in a comment of the cell, wherein the command is one of a plurality of different commands, each of the different commands being configured to be embedded in the comment of the cell; and
   processing the command.

9. The method of claim 8 further comprising, interacting with a second service in response to processing the command.

10. The method of claim 8 further comprising, setting a timer that drives other additional commands in response to processing the command.

11. The method of claim 8, wherein interacting with the first service further includes interacting with a graph service that visually depicts state transitions which model physical movements of a product, wherein the graph service is the first service.

12. The method of claim 11, wherein determining further includes deciding to update the cell when a location for the product moves within the graph service.

13. The method of claim 8, wherein detecting further includes translating the command into a plurality of additional commands and issuing the additional commands to a second service.

14. The method of claim 8, wherein detecting further includes determining the command is an existing formula or macro operation associated with a spreadsheet Application Programming Interface (API) and processing the operation by passing it to the spreadsheet API.

15. A system, comprising:
   a comment string embedded in a spreadsheet; and a spreadsheet interface including code, residing in memory, wherein the comment string includes a command in a format that the spreadsheet interface is adapted to recognize and to process, wherein the command is one of a plurality of different commands, each of the different commands being configured to be embedded in the comment string and processed by a command processor.

16. The system of claim 15, wherein the comment string is associated with one or more cells of the spreadsheet.

17. The system of claim 16, wherein the spreadsheet interface reads the one or more cells of the spreadsheet and detects the command within the comment string.

18. The system of claim 15, wherein the spreadsheet interface is interfaces with one or more external services which are external to the spreadsheet.

19. A system including code residing in memory and comprising:
   means for detecting a command within a spreadsheet, wherein the command is one of a plurality of different commands, each of the different commands being configured to be embedded within a comment associated with a cell of the spreadsheet; and
   means for processing the command;
   wherein the means for detecting the command communicates with the means for processing the command when the command is detected, and wherein the means for processing processes the command independent of operations associated with the spreadsheet.

20. The system of claim 19 further comprising, means for automatically updating a cell of the spreadsheet, wherein the command is associated with a cell.

21. The system of claim 19 further comprising, means for interfacing with one or more external services that are external to the spreadsheet.

22. A machine readable medium for processing commands embedded in comments of a spreadsheet having instructions thereon, the instructions when executed performing the method comprising:
   determining a state change has occurred with a cell of a spreadsheet;
   parsing a comment field associated with the cell to acquire a command, wherein the command is one of a plurality of different commands, each of the different commands being configured to be embedded in the comment field associated with the cell; and
   processing the command.

23. The medium of claim 22 further comprising instructions for receiving the state change from a service that is external to the spreadsheet.

24. The medium of claim 22 further comprising instructions for communicating additional commands to one or more services which are external to the spreadsheet in response to processing the command.

25. The medium of claim 22 further comprising instructions for setting a timer that can trigger additional commands to be processed in response to processing the command.

26. The medium of claim 22 further comprising instructions for interacting with a graph service that communicates a state transition for a location of a product, and wherein in response to the state transition processing the state change within the cell of the spreadsheet using operations associated with the spreadsheet.

* * * * *

UNITED STATES PATENT AND TRADEMARK OFFICE
CERTIFICATE OF CORRECTION

PATENT NO. : 7,426,688 B2 Page 1 of 1
APPLICATION NO. : 10/979268
DATED : September 16, 2008
INVENTOR(S) : Bill Serra et al.

It is certified that error appears in the above-identified patent and that said Letters Patent is hereby corrected as shown below:

In column 11, line 15, in Claim 18, after "interface" delete "is".

Signed and Sealed this

Twenty-eighth Day of July, 2009

JOHN DOLL
*Acting Director of the United States Patent and Trademark Office*